ated Feb. 11, 1975

United States Patent [19]
Schwab et al.

[11] 3,865,207
[45] Feb. 11, 1975

[54] HYDRAULIC FEED FOR WHEEL MOTORS

[75] Inventors: Delmar G. Schwab; Dennis P. Graham, both of Milwaukie, Oreg.

[73] Assignee: Hyster Company, Portland, Oreg.

[22] Filed: June 11, 1973

[21] Appl. No.: 368,841

Related U.S. Application Data

[62] Division of Ser. No. 136,741, April 23, 1971.

[52] U.S. Cl. ............................. 180/44 F, 180/66 F
[51] Int. Cl. ...................... B60k 27/04, B60k 17/30
[58] Field of Search ............. 180/44 F, 44 M, 66 F; 138/120; 285/275, 370

[56] References Cited
UNITED STATES PATENTS

| | | | |
|---|---|---|---|
| 616,032 | 12/1898 | Struhs | 285/275 X |
| 1,166,598 | 1/1916 | Keene | 180/66 F X |
| 2,353,730 | 7/1944 | Joy | 180/66 F |
| 2,399,539 | 4/1946 | Braithwaite | 285/275 X |
| 2,862,731 | 12/1958 | Hedden | 285/370 X |
| 3,008,424 | 11/1961 | Roth | 180/66 F X |
| 3,415,334 | 12/1968 | Vriend | 180/44 M |
| 3,481,419 | 12/1969 | Kress | 180/44 M |
| 3,605,931 | 9/1971 | Firth | 180/66 F X |
| 3,612,204 | 10/1971 | Allen | 180/66 F X |

*Primary Examiner*—Robert R. Song
*Assistant Examiner*—Terrance L. Siemans
*Attorney, Agent, or Firm*—Klarquist, Sparkman, Campbell, Leigh, Hall & Whinston

[57] ABSTRACT

A rough terrain vehicle has a conventional engine-driven primary drive system and an auxiliary hydrostatic assist drive system having a higher ratio drive than the primary drive system. Thus in the assist system, wheel motors in the normally undriven wheels provide traction assist for the primary drivers only when and as needed. An engine-driven pump supplies pressure fluid to the wheel motors through the pivot joint between the vehicle's steering axle and the wheel spindle trunnions. A manually operated forward-reverse master control valve selectively energizes a hydraulic control circuit for the assist system including pressure-operated power control and shorting valves to ensure adequate supply of fluid to the wheel motors to meet demand under various modes of operation. The circuit enables five modes of operation, including a neutral mode, powered forward and reverse modes, a retard mode and an overrun mode. A motor circuit pressure-operated clutch modulator valve controls the engagement of a fluid activated friction clutch between each wheel motor and its driven wheel in a manner so that the clutch is variably engaged or disengaged automatically as dictated by the need for traction assist.

4 Claims, 5 Drawing Figures

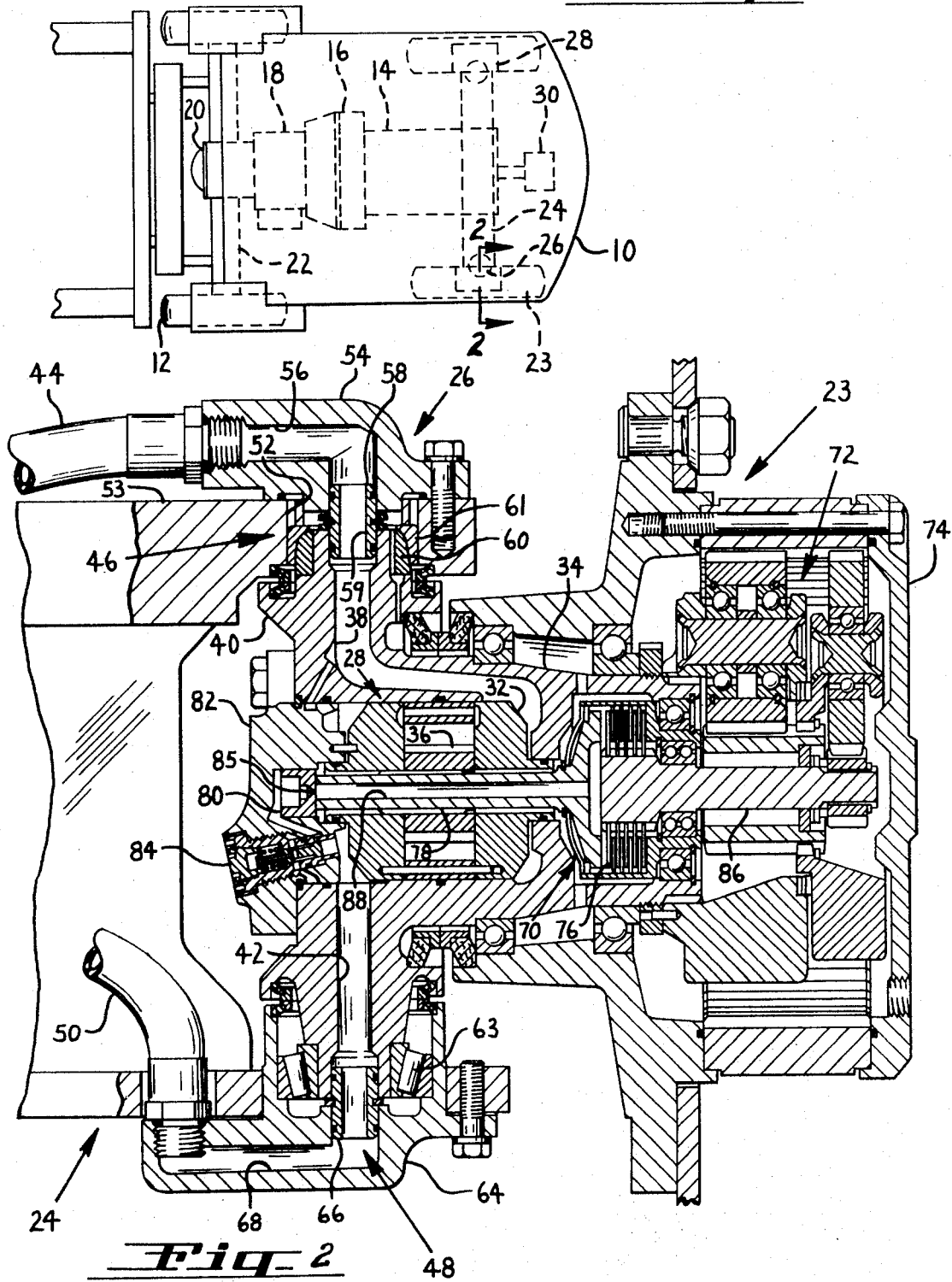

HYDRAULIC FEED FOR WHEEL MOTORS

This is a division of application Ser. No. 136,741, filed Apr. 23, 1971.

BACKGROUND OF THE INVENTION

1. Field of the Invention

The present invention relates to hydrostatic wheel motor drive systems for vehicles and more particularly to an auxiliary drive system which functions to drive the normally undriven wheels of the vehicle and thereby provide additional traction to assist the vehicle's primary drivers in moving the vehicle when needed.

2. Description of the Prior Art

Auxiliary traction assist wheel motor drive systems for rough terrain vehicles are well known. An example of one such system is shown in Budzich U. S. Pat. No. 3,272,279. However, a deficiency of prior such systems is that the output torque of the wheel motors does not vary in response to the demand for additional tractive effort. For example, in the Budzich auxiliary drive system, the hydraulic pressure applied at the wheel motors remains relatively constant despite a varying demand as dictated by variations in vehicle speed relative to engine speed.

Other common deficiencies of prior auxiliary drive systems include: (1) the need of stopping the vehicle before engaging and disengaging the auxiliary drive; (2) inability to use the auxiliary drive in a directional mode opposite that of the primary drive for retarding vehicle motion; and (3) lack of motor protection against cavitation when the motors are backdriven by the wheels as pumps.

One of the primary applications of this invention is in industrial trucks operated on rough terrain. In this application auxiliary hydraulic wheel motors are normally operated under conditions which would produce cavitation in the absence of some sort of cavitation protection because of the great frequency of sharp turns and the frequent transition between soft ground and hard roadways and between light and heavy loads.

In prior auxiliary drive systems, the problem of protecting the hydraulic wheel motors against damaging cavitation is commonly met by providing an overpowered drive system as opposed to an underpowered system. That is, the auxiliary drive system is provided with less reduction or a lower ratio drive than the primary drive system together with a high capacity pump and excess power to ensure adequate oil supply to the wheel motors under all conditions including high angle turns. As a result, when such auxiliary drive systems are engaged, the auxiliary drivers become the primary drive wheels, and the main drivers retard the driving action of such auxiliary drivers. The overpowered auxiliary drive system also uses power inefficiently and provides a low tractive effort in relation to the power available. Stated differently, such prior auxiliary drive systems are not true assist systems in that they take over the function of the primary drivers rather than assist the primary drivers in their effort to move the vehicle.

A control intertie between the primary and auxiliary drive systems such as manual or mechanical interlocks or cutouts are commonly used in various operational speed ranges of prior drive systems to disengage one of the two systems when the other is operating to obviate the foregoing problems. However, in drive systems with such interties, the auxiliary drive is either fully engaged or fully disengaged and not acting as a true assist or supplement to the primary drivers. Such interties also complicate the drive systems considerably and can be subject to malfunction It is also common practice to connect the wheel motors to the hydraulic fluid supply in such a way that supply and return hoses are exposed to damage by rocks, brush and other road and off-road hazards. Such prior hose connections also limit wheel movement and thus the turning radius of the vehicle.

SUMMARY OF THE INVENTION

In accordance with the present invention, an auxiliary hydrostatic traction assist wheel motor drive system automatically provides a variable tractive effort in response to varying vehicle demand when such auxiliary system is engaged.

A primary feature of the invention is the provision of an underpowered assist drive system having a higher drive ratio, or greater reduction, than the primary drive system. The advantages of such an assist system are (1) it provides a true assist drive which helps the primary drivers move the vehicle only when there is slippage in the power train of the main drivers rather than a primary or four-wheel drive type assist drive system; (2) it provides maximum tractive effort for the available power; (3) it provides for highly efficient transfer of power to and utilization of power by the assist wheels; (4) it eliminates power loss in the absence of full power demand by the assist drive system; (5) it reduces loading on the drive system; and (6) it eliminates the need for any precise adjustment of gear ratios between the primary and assist drives.

Another primary feature is the provision of a hydraulic control circuit for the assist drive system which ensures that the hydraulic assist wheel motors will not demand more hydraulic fluid than the available supply with the assist system energized despite the greater reduction of the assist drive than the primary drive, even in the absence of slippage in the primary drive train. This feature has the advantage of permitting sharp angle turns and high speed operation with the assist system energized without damaging the assist wheel motors.

According to another feature of the invention, the auxiliary drive system can be engaged and disengaged while the vehicle is traveling at any speed.

In a more specific aspect of the invention, with the auxiliary drive system energized, a fluid-activated clutch between each wheel motor and its assist wheel is automatically engaged or partially disengaged in response to variations in differential pressure across the wheel motors. As each auxiliary drive wheel approaches the flow limit of its wheel motor, the reduced pressure drop of the system at least partially disengages the clutch to prevent such wheel from driving the motor as a pump.

A further feature of the invention permits engagement of the auxiliary drive system in a directional mode opposite that of the primary drive system to retard vehicle motion, such as when descending a steep grade.

Another feature provides a remote variable retard control to enable the operator to vary the degree of retarding action when the auxiliary drive system is in its retard mode.

When the wheel motors tend to act as pumps, such as when operating in their retard mode, during sharp turns or in the event of overrunning, another feature of the invention in the hydraulic control circuit for the auxiliary drive system protects the wheel motors against cavitation by recirculating fluid flow in the motor circuit from the output to the input side of the motors and at a higher than usual pressure.

A pilot circuit in the auxiliary hydraulic control system is a feature which increases the pressure level in such system in the retard or overrun mode to ensure adequate supply of fluid at the motor inlets.

An object and advantage of the control circuit for the assist drive of the invention is the elimination of all control interties between the primary and assist drive systems formerly used to protect the drive systems in various speed ranges.

In another aspect of the invention, hydraulic fluid is routed to and from the wheel motors and their clutches through a rotary seal in the kingpin or spindle trunnion connection to the steering axle. This feature minimizes exposure of hydraulic lines to the hazards of the terrain in which the vehicle operates without restricting the turning radius of the vehicle.

DESCRIPTION OF THE DRAWINGS

The foregoing and other features, objects and advantages of the present invention will be more apparent from the following detailed description which proceeds with reference to the accompanying drawings wherein:

FIG. 1 is a schematic plan view of a rough terrain lift truck incorporating the present invention;

FIG. 2 is a vertical sectional view on an enlarged scale take approximately along the line 2—2 of FIG. 1;

DETAILED DESCRIPTION

General Arrangement

Figure 3:
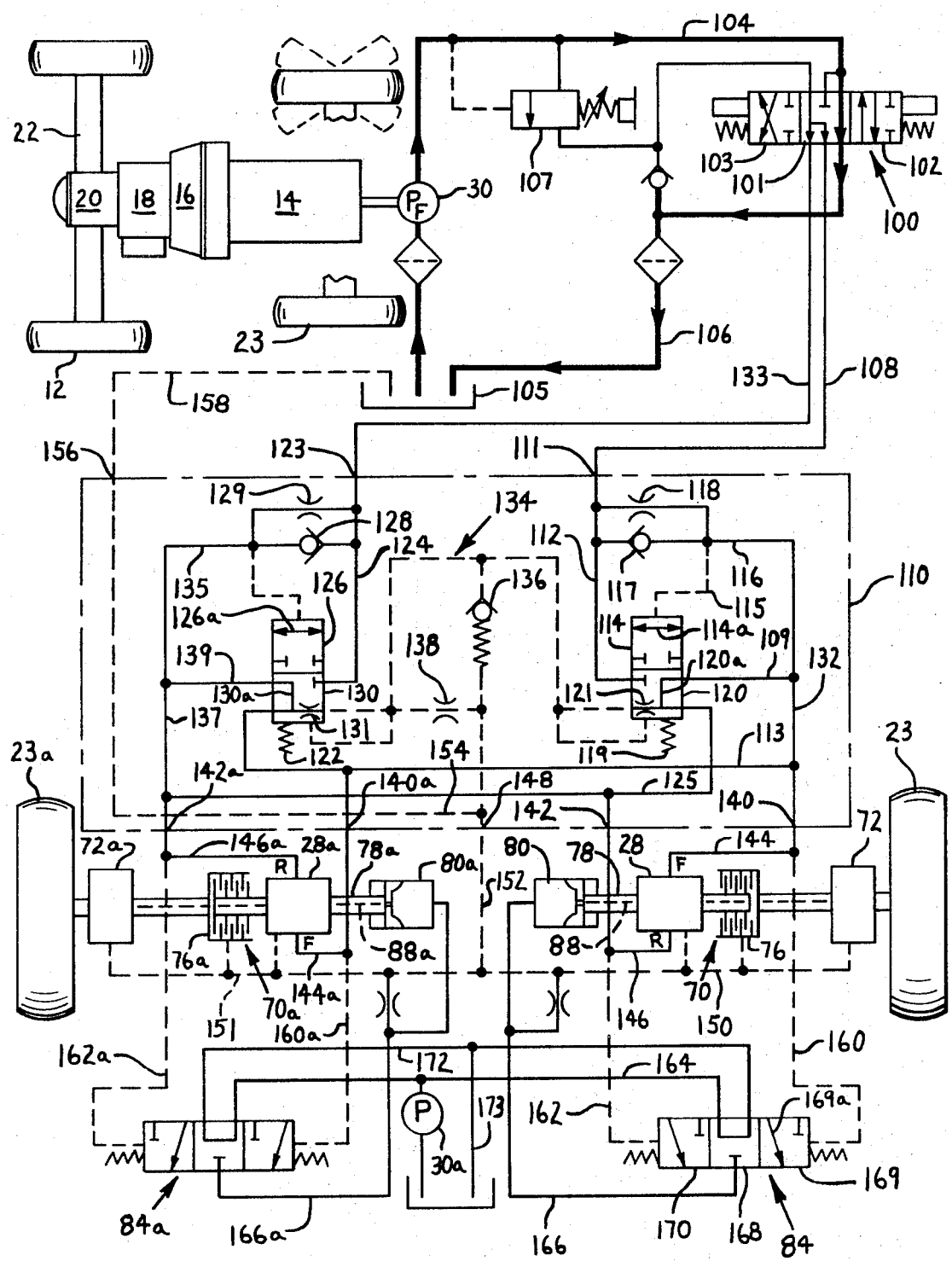
FIG. 3 is a diagram of the hydraulic control circuit of the invention showing the circuit in its neutral mode.

With reference to the drawings, FIG. 1 discloses a typical fork lift truck 10 adapted for rough terrain use. The truck has front drive wheels 12 powered by an internal combustion engine 14 through a torque converter 16, transmission 18, differential 20 and drive axle 22. The truck also includes normally undriven rear steering wheels 23 pivotally connected to a steering axle 24 at a kingpin or spindle trunnion connection 26. Although the rear wheels are not normally driven, each carries a wheel motor 28 that serves as a boost drive or traction assist device when the vehicle needs more traction than the main drive wheels 12 are capable of providing in negotiating rough or steep terrain.

Engine 14 also drives a hydraulic pump means 30 which supplies hydraulic wheel motors 28 with pressure fluid. The pump may also supply other hydraulic components of the vehicle.

Referring to FIG. 2, each wheel motor 28 is of the hydrostatic type and includes a cartridge 32 housed within a pocket in the rear portion of wheel spindle 34. Pressure fluid flows to a rotary portion 36 of motor cartridge 32 through a forward passage 38 in wheel spindle trunnion 40. a similar reverse passage 42 in trunnion 40 leads pressure fluid from the cartridge. Pressure fluid from pump 30 flows through a hydraulic hose 44 on top of steering axle 24 and through a unique rotary joint 46 at kingpin connection 26 into forward passage 38. A similar rotary joint 48 routes hydraulic fluid from the wheel motor reverse passage 42 back to pump means 30 through a hydraulic hose 50.

Rotary Joints

Describing the rotary joints in more detail, with reference to upper joint 46, the upper end of the spindle trunnion 40 extends upwardly within an opening 52 within an upper flange portion 53 of steering axle 24. A cap member 54 into which the outer end of hydraulic hose 44 is threaded fits over and extends partly within opening 52 of axle flange 53. Cap 54 has an internal passage 56 communicating with hose 44 and trunnion passage 38. Cap passage 56 interconnects trunnion passage 38 at a freely rotatable sleeve member 58 having an internal connecting passage 59. The upper portion of sleeve 58 extends within passage 56 of cap 54, whereas the lower portion of such sleeve extends downwardly into passage 38 of trunnion 40. Suitable bushings, one 60 secured to the upper end of trunnion 40 and the other 61 press-fit within axle flange opening 52, provide for relative rotation between the upper end of the spindle trunnion and the axle. Suitable seals as shown are provided between sleeve member 58 and the cap and trunnion, between the cap and axle member and between the trunnion and axle to prevent leakage of fluid at these points.

The lower rotary joint 48 is similar in principle to upper joint 46 just described. However, in a slight variation of the mounting arrangement, tapered roller bearings 63 provide for relative rotation between the lower end of the spindle trunnion and a lower cap member 64. Nevertheless a freely rotatable lower sleeve member 66 similar to upper sleeve 58 has an internal passage connecting trunnion reverse passage 42 with a passage 63 in lower cap 64.

With pressure fluid being fed to and from wheel motor 28 through the rotary connections between the wheel spindle trunnion and the steering axle, the hydraulic hoses and passages do not interfere with the steering function of the wheels and axle. Moreover, such an arrangement minimizes the use of exposed hydraulic hoses. As shown, hoses 44 and 50 are well shielded by the axle itself from terrain hazards.

Clutch Assembly

A rotary clutch means, indicated generally at 70, transmits torque from hydraulic wheel motor 28 to a planetary gear train of conventional design indicated generally at 72 and mounted within wheel hub 74. Rotary clutch means 70 includes a fluid-activated and cooled disc-type friction clutch pack 76 connected to a clutch shaft 78 extending through wheel motor cartridge 32 and terminating at its rear end at a clutch piston 80. Clutch shaft 78 is splined to rotary element 36 of wheel motor 28 but is adapted to slide axially through the wheel motor cartridge to close up and release the clutch pack, depending on the fluid pressure at clutch piston 80. Clutch piston 80 is housed within a spindle cover 82 closing the spindle pocket which houses the wheel motor cartridge.

The cover also houses a clutch modulator valve 84. This valve responds to pressure drop across the wheel motor in a manner so as to control the fluid pressure at the clutch piston and thereby determine when and to what extent the normally disengaged clutch pack will be engaged.

The clutch pack, when engaged, transmits torque from clutch shaft 78 to planetary shaft 86. Torque transmitted by the latter shaft through planetary gear train 72 drives wheel 23 in a direction determined by the direction of flow of fluid through the wheel motor. The operation of the modulator valve will be described in greater detail hereinafter.

Fluid admitted to clutch piston 80 through valve 84 flows through an orifice 85 in the piston and through internal passage 88 in clutch shaft 78 to clutch pack 76 and into the planetary housing to lubricate and cool these elements.

Wheel Motor Control Circuit

With reference to FIG. 3, the hydraulic wheel motor control circuit includes a master control valve means comprising a three-position spool valve 100 spring-centered to its neutral position 101 and movable manually to its forward position 102 and reverse position 103. Pressure fluid is routed to master valve 100 from fixed displacement pump 30 through line 104. In neutral mode, pressure fluid returns to sump 105 through return line 106. A master relief valve 107 determines the maximum pressure in loop 104 and also in the motor circuit in the powered forward and reverse modes of operation.

The circuit also includes a charge valve assembly 110 which is preferably incorporated in a junction block installed, for example, on steering axle 24. The charge valve assembly provides cross-porting to divide hydraulic flow to each wheel motor.

The charge valve assembly has a forward supply port 111 through which pressure fluid is directed from master control valve 100 through passage 112 to a forward power control valve spool 114. Forward charge spool 114 is connected in parallel with a forward spool bypass line 116 having a forward supply check valve 117. A forward supply balance orifice 118 is connected in parallel with the forward supply check valve. Forward power control spool 114 incorporates a shorting valve means or portion 120 including a shorting passage 120a and a shorting orifice 121.

The charge valve assembly also has a reverse supply port 123 through which pressure fluid from master control valve 100 is directed in the reverse mode into a charge passage 124 to a reverse power control spool 126. The reverse charge circuit is identical to the forward charge circuit just described, and includes reverse supply check valve 128 in a reverse spool bypass line 135 and a reverse supply balance orifice 129, both in parallel with reverse power control spool 126.

Like the forward power spool 114, reverse power spool 126 incorporates a shorting valve portion 130 including a shorting orifice 131.

Alternatively, forward and reverse check valves 117, 128 and forward and reverse balance orifices 118, 129 could be replaced by an equivalent shuttle valve and orifices all within a common shuttle valve spool. similarly, the shorting orifices 121, 131 could be provided externally of their respective spools 114, 126.

The charge valve assembly also includes a pilot circuit designated generally at 134 and including a pilot circuit designated generally at 134 and including a pilot relief valve 136 and pilot bleed orifice 138. The pilot circuit 134 functions when the forward or reverse power spool is in its shorting range, that is, when there is flow through either shorting valve passage 120a or 130a, to build up sufficient pressure in the motor circuit to ensure adequate filling of the motors before permitting fluid to be metered through one of the power spools back to the reservoir.

The charge valve block also includes forward motor supply ports 140, 140a and reverse motor supply ports 142, 142a. The forward motor supply ports connect with lines 144, 144a leading to the forward inlet ports of the right- and left-hand wheel motors 28 and 28a respectively. The reverse motor supply ports connect with lines 146, 146a leading to the reverse inlet ports of the right- and left-hand wheel motor respectively.

A motor case drain port 148 in the charge valve block connects with motor case drain lines 150, 151, 152 to direct drain fluid through passage 154, motor case drain tank port 156 and line 158 back to the reservoir. Motor case drain lines 150, 151 also drain the clutch packs 76, 76a and the planetary gear trains 72, 72a.

Clutch modulator valve 84, 84a for the two wheel motors are responsive to differential pressure across the wheel motors 28, 28a as sensed through pilot lines 160, 160a from the forward side of the wheel motors and through pilot lines 162, 162a from the reverse side of the wheel motors. In the FIG. 3 control circuit the right- and left-hand clutch pistons 80 and 80a receive pressure fluid through the clutch modulator valves and clutch supply lines 164, 166, 166a from an auxilliary pump 30a. Alternatively, as shown in FIG. 2, clutch pressure fluid could be supplied from the motor circuit by the same primary pump 30 that supplies pressure fluid to the motor circuit.

Clutch modulator valves 84, 84a are three-position spools spring-centered to neutral positon 168, but movable under a predetermined pressure drop across the wheel motors to one of two clutch-operating positions 169, 170, depending on whether the wheel motors are operating in their forward or reverse mode. When the clutch modulator spools are in their neutral positions, pressure fluid from auxiliary pump 30a returns to sump through clutch fluid return lines 172, 173.

OPERATION

The wheel motor circuit described provides an adaptive control system. Such system senses the tractive condition of primary drive wheels 12 by continuously comparing the speed of engine 14 to the ground speed of the vehicle. Then, unlike prior systems, such system varies the output of the wheel motors 28, 28a and thus the tractive effort supplied by auxiliary drive wheels 23, 23a in response to the changing tractive capability of the primary drive wheels.

Since the assist drive transmission to wheels 23 is at a higher drive ratio than the primary drive transmission to main drive wheels 12, the assist wheels provide no tractive effort under normal drive conditions in which there is no appreciable slippage in the main drive path, even when the assist control system is engaged. However, at any given engine speed, increased slippage in the main drive path results in a slowing of vehicle speed and thus a slowing of the assist wheels. The slowing of assist wheels 23 in comparison to engine speed is thus indicative of slippage in the main drive path and is sensed by the wheel motors through a corresponding increase in differential pressure across such motors, reflecting wheel motor demand. The control circuit responds by directing the available oil supply from pump 30 through the fully open upstream one of control spools 114, 126 to the motor inlets to meet demand. At the same time the downstream one of spools 114, 126 meters return flow back to sump and determines the discharge pressure at the motors. Thus the motor discharge pressure is the control base to which pressures throughout the control circuit are referenced. Therefore the inlet pressure available to drive the motors at any moment is determined by the sum of the differential or demand pressure across the motors and motor discharge pressure.

The assist control system as thus briefly described operates in a manner enabling the wheel motors to transmit torque to the assist wheels only to the extent needed by such wheels to assist the primary drivers when there is slippage in the primary drive path.

Neutral Mode of Operation

In the neutral mode, master control valve 100 is spring-centered to its neutral position as shown in FIG. 3. This is the position of the master valve when the operator anticipates that no auxiliary tractive effort will be needed to keep the vehicle moving at the desired speed. In its neutral position, master control valve 100 directs pressure fluid from line 104 to return line 106 back to sump 105. At the same time, pump 30 may be supplying pressure fluid to other hydraulic functions of the vehicle unrelated to the auxiliary wheel motors. In the neutral mode, there is no fluid flow in the motor circuit because wheel motors 28, 28a are mechanically disconnected from wheels 23, 23a by clutches 70, 70a. The lack of differential pressure across the wheel motors maintains clutch modulator valves 84, 84a in their neutral positions to prevent clutch engagement.

Powered Forward and Reverse Modes

Figure 4:
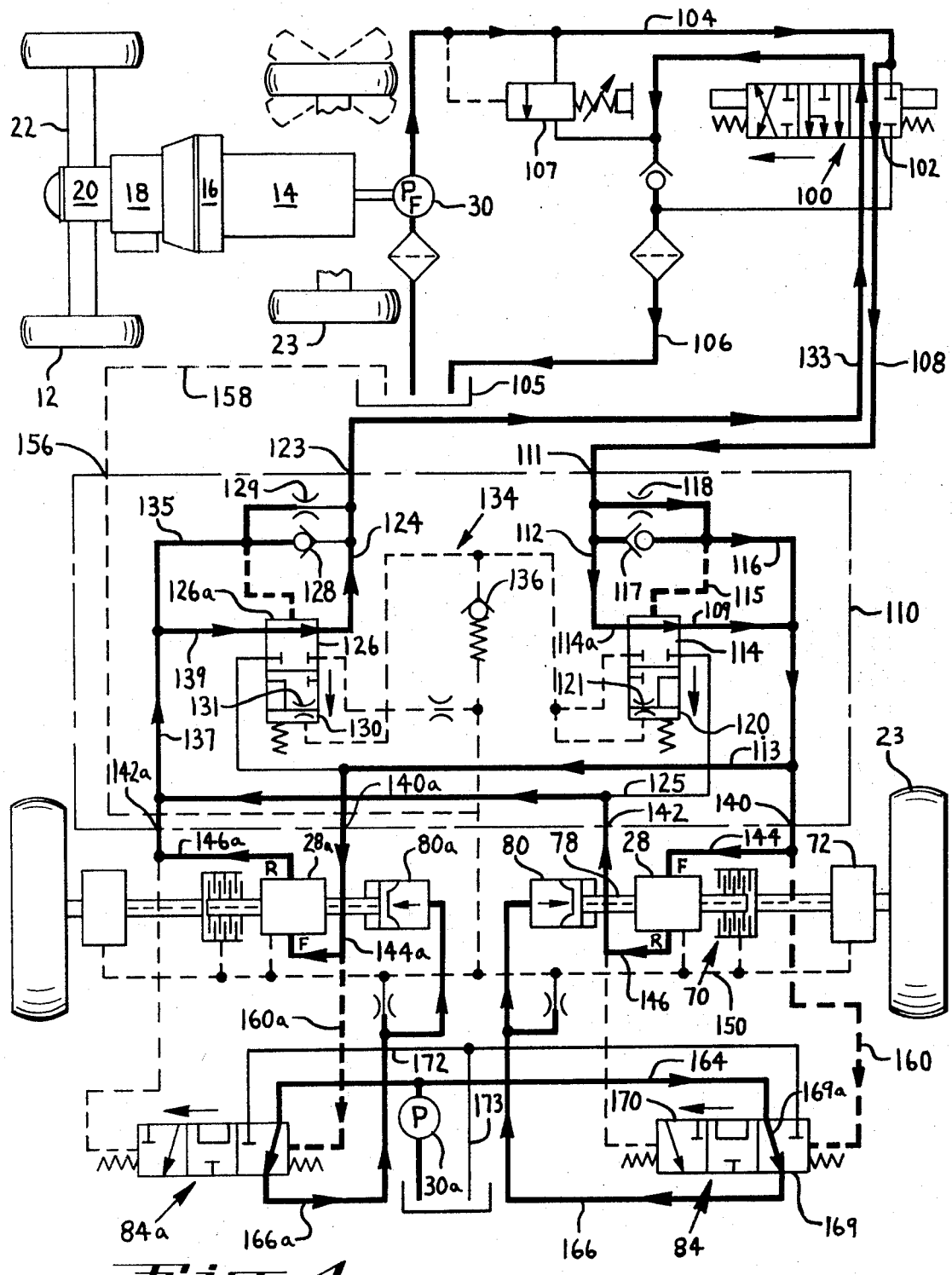
FIG. 4 is a diagram similar to that of FIG. 3, but showing the circuit in its powered forward mode.

Operation of the hydraulic motor control circuit in the powered forward mode is illustrated in FIG. 4. Operation of the control circuit in the forward mode is described with the understanding that a similar description and sequence of events applies to operation of the circuit in its reverse mode.

With the vehicle traveling in a forward direction and the operator detecting a need for auxiliary traction assist, he manually shifts master valve 100 to its forward position 102. The master valve admits pressure fluid to forward supply line 108, from which it flows through forward supply port 111, forward supply check valve 117 of bypass passage 116, passages 132 and 113, forward motor ports 140, 140a and forward motor supply lines 144, 144a to the forward inlet ports of wheel motors 28, 28a. At the same time fluid flows through passage 109, passage 120a of shorting valve 120, passage 125 and lines 146, 146a to the reverse inlet ports of the motors. All motor ports thus experience a rise in pressure.

As the pressure in the motor circuit rises, such pressure increase is sensed by forward control spool 114 through pilot line 115. At a predetermined pressure the forward spool shifts to block flow through shorting valve 120 and permit flow through valve passage 114a to the forward motor ports, in response to motor demand. Thus flow through valve passage 114a is combined with the parallel flow through line 116 to supply the total flow required at the motor inlets to meet motor demand.

At the same time, pressure buildup in the motor circuit shifts reverse power control spool 126 downwardly, whereby flow from the outlet ports of the fluid motors is blocked at reverse supply check valve 128, but metered back to sump through passage 126a of reverse spool 126.

Under the foregoing conditions, the fluid pressure at the forward motor ports reflects the drive load to the motors. The maximum allowable drive pressure is controlled by the setting of the master control relief valve 107. The fluid pressure at reverse motor ports 142, 142a reflect the reverse power control spool metering schedule as determined by the valve design and resistance of reverse spool spring 122. This meter-out pressure schedule of the reverse control spool 126 depends on the flow rate through the circuit.

In order for the pressure drop across the wheel motors to reflect the demand torque of the rear wheels, clutch modulator spools 84 and 84a must shift at a relatively low pressure drop across the motors to connect the motors to such wheels. Thus, after master control valve 100 is shifted to its forward position and a predetermined low pressure drop across the motors develops, clutch modulator valves 84, 84a shift to one of their two operative positions 169 or 170. Clutch pressure fluid from line 164 flows through valve passages 169a and lines 166, 166a to clutch pistons 80, 80a. Pressure buildup at the clutch pistons, slides clutch shafts 78, 78a through their motor cartridges, forcing clutch packs 70, 70a closed to engage the clutches and thus transmit torque through clutch shafts 78, 78a, clutch packs 76, 76a and planetary units 72, 72a to auxiliary drive wheels 23, 23a. Because modulator valves 84, 84a are sensitive to pressure drop across the wheel motors, a decrease in such pressure drop, such as when the wheel motors approach their flow limits, tends to return the valves to their neutral positons. This causes a reduction in pressure at the clutch pistons and either partial or full clutch disengagement as dictated by clutch fluid pressure and the position of the modulator spools.

As previously indicated, the same sequence of events occurs when master valve 100 is moved to its reverse position 103 to operate the motors in their reverse modes except that charging first occurs through the reverse bypass line 135 and power control spool 126 rather than through the forward bypass line and control spool. Clutch modulator spools 84 and 84a are adapted to operate in the same manner in both the forward and reverse modes, in both cases operating in response to a predetermined differential pressure across the wheel motors.

The clutch arrangement shown, including rotary clutch piston 80 and shaft 78 with multiple disc oil clutch pack 76, with the clutch shaft being rotatable with the hydraulic motor but slidable through the motor cartridge, permits the clutch to be fully engaged, partially engaged, or disengaged while the vehicle is moving throughout the entire speed range of the vehicle, engine and hydraulic motors.

Overrun Mode of Operation

Still referring to FIG. 4, the overrun mode is an extension of the powered mode in the instance when the speed of the wheel motors exceeds available fluid supply flow. This occurs, for example, when the main drive wheels regain traction so that the vehicle gains speed to an extent such that the rear wheels 23 start to back-drive the wheel motors 28, 28a as pumps. Under this condition, assuming the vehicle is still traveling in a forward direction and with the master control valve still in its forward position, the reverse motor port pressures exceed the forward motor port pressures, whereby the motors function as pumps. The resultant pressure drop at the input side of the motors causes forward power control spool 114 to shift upwardly, cutting off flow through passage 114a but permitting flow through check valve 117 and bypass passage 116. The upward shift of spool 114 also permits recirculation of fluid from the motor reverse ports through lines 146, 146a, reverse motor ports 142, 142a, passage 125, shorting valve passage 120a, passage 109, passage 132, forward motor ports 140, 140a, and forward supply lines 144, 144a back to the forward motor inlet port. At the same time pilot circuit 134 is energized to shift reverse control spool 126 upwardly, thereby increasing the pressure in the motor circuit to an extent sufficient to ensure adequate charging flow to the motors.

In the overrun condition valve 126 continues to meter flow back to sump. However, the pressure in pilot circuit 134 acting at the spring end of reverse control spool 126 ensures that such spool does not meter flow back to sump without providing the positive recirculation pressure necessary at high flow rates to protect the hydraulic motors against damaging cavitation.

The anticavitation protection circuit just described is a safety feature in the illustrated embodiment which protects the hydraulic wheel motors in the powered mode if the clutches should fail to disengage. However, normally when rear wheels 23 reach a speed such that they begin to back-drive the wheel motors, the pressure differential across the wheel motors drops to a low level, thereby returning the modulator spools 84, 84a to their neutral positions and at least partially disengaging the clutches. If desired, however, modulator valves 84, 84a could be eliminated from the disclosed circuit so that the assist motors would remain connected to the assist wheels at all times when the assist motor circuit is energized. In such case, the anticavitation protection circuit, including pilot circuit 134, would become the primary means of protecting the assist motors against cavitation in the overrun mode.

Preferably the wheel motor drive system is designed so that, in at least low gear and in the absence of slippage in the primary drive path, there is never sufficient pressure fluid flow available to traction assist motors 28, 28a to drive rear wheels 23, 23a at the same speed that engine 14 drives main drive wheels 12. This feature ensures that the traction assist unit functions only when needed, that is, only as an assist or boost drive when the main drive wheels slip to slow the vehicle and rear wheels to a speed that the traction assist drive unit is capable of matching or exceeding. This means that so long as there is no slippage in the primary drivers 12 or the primary drive train, the assist motor clutches remain disengaged or at most only partially engaged, even though the master contol valve remains in a position to energize the wheel motor circuits. However, normally the operator will return the master control valve to its neutral position to denergize the wheel motor circuit when he anticipates no further need for traction assist.

Retard Mode of Operation

Figure 5:
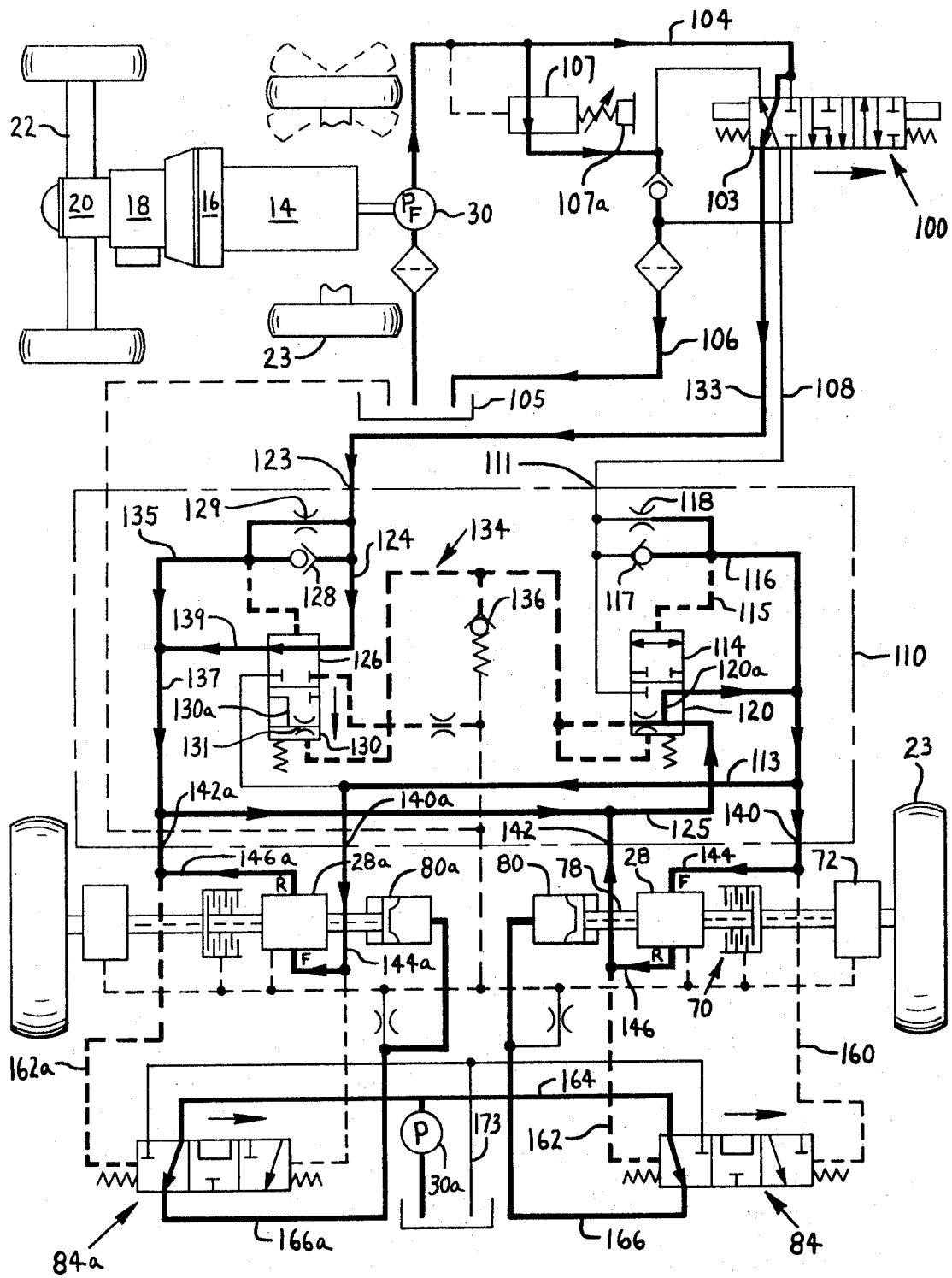
FIG. 5 is a diagram similar to those of FIGS. 3 and 4 showing the hydraulic circuit in its retard mode.

As described in conjunction with the overrun mode, the motor control system has an anticavitation motor protection circuit. As shown in FIG. 5, this motor protection circuit enables use of the traction assist wheel motors as pumps purposely to provide a braking effect to the vehicle and thus a retard mode of operation.

Assuming the vehicle is traveling in a forward direction and it is desired to retard or brake forward motion, the operator moves master control valve 100 to its reverse position 103. The initial sequence of events is similar to that which occurs when the reverse powered mode is selected. Initial flow is through reverse supply port 123, reverse supply check valve 128, and reverse spool bypass line 135, passages 137, 125, 146 and 146a to the reverse motor inlet ports.

At the same time, flow through passage 139, reverse shorting valve passage 130a and shorting orifice 131 energizes pilot circuit 134 to elevate the fluid pressure in the motor circuit and ensure adequate recirculation of fluid in such circuit. All excess flow returns to sump through relief valve 107. Relief valve 107 may include a manually variable relief pressure setting device 107a as shown, thereby functioning as a manually variable retard control. This feature provides for remote operator control of the desired retard pressure level, or degree of retard, and eliminates the need to tailor the internal valves within assembly 110 to meet various applications. Alternatively, a remote manually variable retard control means could be provided by a suitable variable orifice through master control valve 100.

Variable pressure relief control 107a is also operable in the forward and reverse powered mode to manually vary the motor inlet pressure and therefore the tractive effort at the assist wheels.

Since reverse spool 126 is initially in its shorting range, there is also flow through passage 139, shorting spool passage 130a, passage 113 and lines 144 and 144a toward the forward motor ports. Thus all motor ports in the charge valve assembly are pressurized through reverse supply check valve 128, and motor-induced fluid circulation is shorted from the reverse motor ports back to the forward motor ports through shorting valve portion 130 of reverse control spool 126.

As the motor port pressures exceed a predetermined level of, say, 450 p.s.i., the reverse power control spool shifts to block its shorting passage 130a. As the spool continues to shift, it connects passage 126a to fluid supply line 124 from the master control valve, thereby connecting reverse supply port 123 to reverse motor ports 142, 142a. Simultaneously, forward power control spool 114 shifts toward blockage of its shorting passage 120a, but stops at a stroke required to maintain a predetermined pressure of, for example, 500 p.s.i at the forward motor ports 140. The metering of shorting flow through shorting passage 120a of valve 114 from the reverse motor ports back to the forward motor ports continues until the vehicle stops or the master control valve returns to neutral.

Thus, except for very low flow rates, the motor circuit flow rates are independent of supply flow, and are directly dependent upon motor speed. The rate of flow through reverse supply port 123 and reverse spool 126 may be very low, since only enough fluid is required to make up for leakage losses. Most of this make-up flow is returned to the reservoir through the motor case drain tank port 156. Only a small flow through the forward supply balance orifice 118 returns to sump through the master valve.

Throughout the charging of the motor circuit as described, the pilot circuit 134 remains active to maintain the forward motor port pressures high enough to ensure filling of the motors in their pumping modes and while recirculating fluid in the motor circuit at a high flow rate. The maximum pilot pressure is controlled by the setting of pilot relief 136. The pilot circuit is designed to be energized only when needed to ensure adequate pressure for recirculation of flow in the motor circuit.

With the circuit functioning as shown in FIG. 5, rear wheels 23, 23a traveling in a forward direction tend to pump fluid from the reverse motor ports back to the forward motor ports. However, fluid supply pump 30 tries to pump fluid toward the reverse motor ports. Thus the wheel motors pump against a high pressure which provides a strong braking or retarding action to a degree determined by the pressure setting of valve 107 to slow rotation of the rear wheels and thus the vehicle. This retarding effect can be used to supplement downhill braking or as an emergency braking should the vehicle's main brakes fail.

Of course, the foregoing assumes that wheel motor clutches 70, 70a are engaged in the retard mode. The clutches remain engaged by the high differential pressure across the wheel motors which is transmitted through pilot lines 160, 160a and 162, 162a to clutch modulator valves 84, 84a. This high differential pressure shifts such valves toward the right in FIG. 5 to engage the wheel motor clutches. The clutches remain engaged until the braking action of the fluid reduces the speed of the vehicle and thus the pressure drop across the motors to a low level.

The hydraulic traction assist motor control system shown is an open-center system. However, the principle disclosed are also applicable to a closed-center hydraulic power control system.

Having illustrated and described a preferred embodiment of our invention, it should be apparent to those skilled in the art that the same permits of modification in arrangement and detail. We claim as our invention all such modifications as come within the true spirit and scope of the following claims.

We claim:

1. In a vehicle having a main frame, steerable wheel means connected by trunnion means to an axle means for pivoting movement about an axis of said trunnion means, a hydraulic drive arrangement for said steerable wheel means comprising:

hydraulic motor means mounted within said wheel means for driving said wheel means, hydraulic pump means on said frame remote from said motor means, hydraulic fluid passage means interconnecting said pump and motor means, said fluid passage means including internal passageway means extending within said trunnion means into communication with said motor means, and conduit means extending from said pump means on said frame to said axle means, coupling means on said axle means interconnecting said conduit means and said internal passageway means in a manner permitting pivoting movement of said trunnion means unrestricted by said conduit means, said coupling means including a cap member stationarily mounted on said axle means, said cap member including internal passage means in communication with said conduit means, a rigid rotatable sleeve member interconnecting said cap member and said trunnion means, said rigid rotatable sleeve member extending within adjacent end portions of said internal trunnion passage means and said internal cap passage means, said rigid rotatable sleeve member permitting relative rotation between said cap member and said trunnion means and comprising an interconnecting fluid passage between said cap passage means and said trunnion passage means, and said rigid rotatable sleeve member including means providing a fluid seal between said rigid rotatable sleeve member and said cap member and between said rigid rotatable sleeve member and said trunnion means.

2. A hydraulic drive arrangement according to claim 1 wherein said internal passageway means includes a port in an exterior surface portion of said trunnion means, said cap member being spaced apart from said trunnion means, said rigid sleeve member extending within said space between said cap member and said trunnion means and being rotatable relative to said cap member and said trunnion means.

3. A hydraulic drive arrangement according to claim 1 wherein said wheel means includes a wheel hub mounted for rotation on a wheel spindle means, said spindle means being rigidly connected to said trunnion means, said hydraulic motor means being mounted within said spindle means, said internal passageway means including a passageway portion extending within said spindle means into communication with said wheel motor means.

4. A hydraulic drive arrangement according to claim 1 wherein said wheel means includes a pair of said steerable wheel means mounted at opposite ends of said axle means by a pair of said trunnion means, a pair of said hydraulic motor means one within each said wheel means, junction box means on said axle means, said conduit means including first conduit means extending between said pump means and said junction box and second conduit means extending between said junction box means and each of said trunnion means, said junction box means including means dividing the flow of pressure fluid from said pump means between said pair of hydraulic motors.

* * * * *